Patented Dec. 5, 1933

1,938,468

UNITED STATES PATENT OFFICE 1,938,468.

PROCESS OF PREPARING SHELLAC - LIKE RESINS FROM AGATHO-COPAL RESINS

Johannes Scheiber, Leipzig, Germany, assignor to Walter Dux, Hanover, Germany

No Drawing. Application July 17, 1930, Serial No. 468,744, and in Germany November 9, 1929

3 Claims. (Cl. 260—2)

This invention relates to a process for improving the properties of the so-called agatho-resins which comprise the different varieties of Manila-copal-resins, cowrie-copal-resins and the like. Agatho-resins are used in large quantities in different industries. Soft Manila-resins for example are the base of most alcohol-lacquers, hard Manila-resins and cowrie-resins are the base of most oil lacquers. The improvement of the properties of these resins forming the object of my invention enlarges widely the field in which these products may be used. Soft Manila-resins for instance are very much inferior to shellac which they often are to replace not only in regard to the hardness of the films obtained but moreover in not being capable of being transformed by heat into an insoluble and infusible mass. The hard Manila- and cowrie-resins are practically insoluble in solvents and must be subjected to a decomposing melting process to render them soluble which causes considerable losses and diminishes greatly the valuable properties of the original resins. For the same reasons these copal-resins are but poor shellac-substitutes in other arts, as for instance in the manufacture of plastic masses etc.

According to my invention the properties of the agatho-copal-resins are improved so as to more closely resemble the properties of shellac by combining these materials with polyhydroxy-carboxylic acids of an aliphatic nature such as for example trihydroxy-stearic acid, under the influence of heat.

It has already been proposed to heat oxidized Manila-copal-resins with oxidized fatty acids. This process is based on the principle of substituting for the shelloic-acid which forms a main-component of the natural shellac-resin, one of the oxidized Manila-copal-resin-acids (being hydroaromatic-hydroxy-carboxylic acids). From this known process my invention differs by using unoxidized and chemically unchanged copal-resins, thus avoiding not only the costs of oxidation but moreover the losses inevitable in the oxidizing process.

In carrying out my invention it is essential to first produce an intimate mixture of the ingredients, the copal-resin and the polyhydroxy-carboxylic fatty acid forming the starting materials. A large quantity of impurities is usually found in copal resins, especially in the varieties termed the "soft Manila-copals." In order to utilize materials containing impurities, the mixture of the component ingredients may be prepared in the following manner.

The copal-resin is first dissolved in a hot dilute alkali solution, and it is then filtered to free it from dirt and other impurities. To the clear resin solution, an alkaline solution of the aliphatic polyhydroxy-carboxylic acid used in the process is added. The mixture of the two alkaline solutions is treated with a mineral acid, such as hydrochloric acid, and a precipitate is obtained. The liquid is filtered to remove the precipitate, which is then washed and dried. The product is then heated to a suitable temperature, for example, 140–160° C., or even to a higher temperature, to produce my new resin product. The reaction may be regarded as completed if the resulting mass becomes clear and does not foam.

The process may be carried out under a vacuum or catalysts such as zinc chloride may be added for the purpose of expediting the reaction.

The products obtained according to my invention are completely soluble in alcohols without leaving any remainder, whilst the solubility in hydrocarbons as for instance kerosene is limited. Excellent alcohol-lacquers and varnishes may be prepared with these products, the resulting films of which exhibit the hardness, toughness and polishing properties of shellac-films.

The products exhibit furthermore the transformability on heating of shellac. Therefore care must be taken in melting and heating the products in the course of manufacture. If the products are overheated they will change very quickly into a practical insoluble and infusible mass. This property is very important and advantageous for many purposes in first using the soluble resins for coating or impregnating and in then rendering them insoluble and infusible by applying heat, if desired, under pressure.

As an example of the production of a shellac-like resin product by the process of my invention, the following procedure may be followed.

Take 100 parts of Manila-copal-resin and dissolve in about 300 parts of a 10% solution of sodium or potassium hydroxide. After separating the essential oils and filtering to free the solution from the impurities and the insoluble components, 45 parts of an alkaline solution of trihydroxy-stearic acid is added. The mixture is then precipitated by dilute hydrochloric acid, and the resulting precipitate is filtered, washed and dried, to remove adhering moisture. The product is then heated to about 150° C., until a clear, quietly flowing, mass is obtained which will not foam, even under a vacuum.

The resin product thus obtained is completely soluble in alcohol, and insoluble in hydrocarbons and fatty oils. It is also soluble in weak alkalies, and even in borax solutions, and will be changed into an insoluble and infusible product when heated to 180-200° C. for about 20 minutes. The yield is 120-125 parts, and the production may advantageously be used as a substitute for natural shellac.

The characteristics of the resulting resin products can be modified by a proper choice of the copal-resins and of the polyhydroxy-carboxylic fatty acids. For example, resins of a relatively high solubility may be obtained by use of the so-called soft Manila-copal-resins; while the harder copal-resins, such as hard Manila-copal-resin or cowrie-copal-resin, will give products which are readily changed by heating into the desired resinous product. The polyhydroxy-carboxylic fatty acids which are used in my new process may be prepared by oxidation of suitable fatty acids or acid mixtures. These suitable fatty acids may easily be produced by saponification of unsaturated fatty oils, as linseed oil, castor oil, poppy-seed oil, etc. The most suitable polyhydroxy-carboxylic acids are trihydroxy-stearic acid, the so-called sativinic-acids (produced from linseed oil acids by oxidation), and dihydroxy-stearic acid.

The new resins of my invention may be used as such or combined with other suitable natural or artificial resins or with waxes etc. For example they may be mixed with natural shellac which they will undoubtedly replace to a large extent.

The products may not only be used for lacquers and varnishes and the like but also on account of their quality of heat transformability for insulating and impregnating purposes of all kinds and as binding substances in the art of making plastic masses or pressed materials, such as for instance records of talking-machines and the like.

I claim:

1. A process for preparing shellac-like resins which consists in dissolving agatho-copal resins in a solution of an alkali, mixing this solution with an alkaline solution of a polyhydroxy-carboxylic fatty acid, precipitating the mixture with a mineral acid and heating the filtered precipitate until the melt is soluble in cold alcohol.

2. A process for preparing shellac-like resins which consists in dissolving agatho-copal-resins in a solution of an alkali, mixing this solution with an alkaline solution of a polyhydroxy-carboxylic fatty acid, precipitating the mixture with a mineral acid and heating the filtered precipitate under reduced pressure until the melt is soluble in cold alcohol.

3. Shellac-like resins which are obtained by precipitating mixtures of alkaline solutions of agatho-copal resins and polyhydroxy-carboxylic fatty acids by a mineral acid, and heating the intimate mixture of the precipitated components.

JOHANNES SCHEIBER.